(12) United States Patent
Oki et al.

(10) Patent No.: US 8,711,307 B2
(45) Date of Patent: Apr. 29, 2014

(54) HEAT SHIELD AND LAMINATED GLASS

(75) Inventors: Kazuhiro Oki, Ashigarakami-gun (JP); Wataru Majima, Ashigarakami-gun (JP); Mitsuyoshi Ichihashi, Ashigarakami-gun (JP); Yuichi Shirasaki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 304 days.

(21) Appl. No.: 13/019,094

(22) Filed: Feb. 1, 2011

(65) Prior Publication Data

US 2011/0187973 A1    Aug. 4, 2011

(30) Foreign Application Priority Data

Feb. 2, 2010   (JP) .................................. 2010-021050

(51) Int. Cl.
  *G02F 1/1335*  (2006.01)
  *G02B 5/08*  (2006.01)
  *B60J 3/00*  (2006.01)

(52) U.S. Cl.
  USPC .......................... 349/115; 359/838; 296/97.2

(58) Field of Classification Search
  USPC ........................... 349/115; 296/97.2; 359/838
  See application file for complete search history.

(56) References Cited

U.S. PATENT DOCUMENTS

2007/0109673 A1*   5/2007   Padiyath et al. .............. 359/839

FOREIGN PATENT DOCUMENTS

| JP | 06-194517 A | 7/1994 |
|---|---|---|
| JP | 06-263486 A | 9/1994 |
| JP | 3500127 B2 | 11/2001 |
| JP | 2002-509279 A | 3/2002 |
| JP | 2002-131531 A | 5/2002 |
| JP | 3745221 B2 | 7/2002 |
| JP | 4109914 B2 | 1/2004 |
| JP | 4008358 B2 | 9/2004 |
| JP | 2009-514022 A | 4/2009 |
| WO | 99/36808 A1 | 7/1999 |
| WO | 2007/050433 A1 | 5/2007 |

OTHER PUBLICATIONS

Office Action dated Feb. 8, 2014 in Chinese Application No. 201110035086.8.

* cited by examiner

*Primary Examiner* — Jerry Blevins
(74) *Attorney, Agent, or Firm* — Sughrue Mion, PLLC

(57) ABSTRACT

A heat shield comprising a first light-reflective layer, having a reflectance peak both in a wavelength range of from 400 nm to less than 850 nm and in a wavelength range of from more than 850 nm to 1300 nm and satisfying C>A>B, is disclosed. "A" means the maximum reflectance in the wavelength range of from 400 nm to less than 850 nm; "B" means the reflectance at a wavelength of 850 nm; "C" means the maximum reflectance in the wavelength range of from more than 850 nm to 1300 nm; and "B" is equal to or less than 50%.

24 Claims, 2 Drawing Sheets

HEAT SHIELD AND LAMINATED GLASS

CROSS-REFERENCE TO RELATED APPLICATIONS

The present application claims the benefit of priority from Japanese Patent Application No. 2010-021050, filed on Feb. 2, 2010, the contents of which are herein incorporated by reference in their entirety.

BACKGROUND OF THE INVENTION

1. Field of the Invention

The present invention relates to a heat shield comprising a light-reflective layer formed of a fixed cholesteric liquid-crystal phase, and to laminated glass having it. The heat shield and the laminated glass of the invention are useful for heat shield for windowpanes for automobiles.

2. Background Art

With the recent increase in interest in environment and energy-related issues, the needs for energy-saving industrial products are increasing; and as one of them, glass and film are desired that are effective for heat shield for windowpanes for houses, automobiles, etc., or that is, effective for reducing heat load due to sunlight. For reducing heat load due to sunlight, it is necessary to prevent transmission of sunlight rays falling within any of the visible range or the infrared range of the sunlight spectrum. In particular, windowpanes for automobiles are required to have high transmittance of visible light from the safety viewpoint, and are additionally required to have a high level of heat shieldability. In the State of California in US, there is a move to control Tts (total solar energy transmitted through glazing).

Laminated glass coated with a special metallic film capable of blocking out thermal radiations, which is referred to as Low-E pair glass, is often used as eco-glass having high heat-insulating/heat-shielding capability. The special metallic film may be formed by lamination of plural layers, for example, according to a vacuum-deposition method disclosed in JP-A 6-263486. The special metallic film formed through vacuum deposition is extremely excellent in reflectivity, but the vacuum process is nonproductive and its production cost is high. In addition, when the metallic film is used, it also blocks electromagnetic waves; and therefore in use in mobile telephones and the like, the metallic film may causes radio disturbance; or when used in automobiles, there may occur a problem in that ETC (electronic toll collection) could not be used. Not only for evading the problem of radio disturbance but also from the safety viewpoint, windowpanes for automobiles are required to have high transmittance of visible light.

For solving the problem of radio disturbance, for example, JP-A 2002-131531 discloses a method of using a layer containing metallic fine particles. The metallic fine particles-containing film is excellent in visible light transmittance but has a low reflectivity to light falling within a wavelength range of from 700 to 1200 nm that significantly participates in heat shielding, and therefore has a problem in that its heat-shielding capability could not be enhanced.

For preventing reduction in visible light transmittance and for lowering insolation transmittance falling within a range of from 700 to 800 nm, for example, JP-A 6-194517 proposes a method of coating glass with a layer containing an IR-absorbing dye. Use of an IR-absorbing dye may lower insolation transmittance but is problematic in that the film surface temperature rises through insolation absorption and the heat-shielding capability of the film lowers through re-release of the heat.

For satisfying both high visible light transmittance and high reflectivity in a wavelength range of from 700 to 1200 nm, for example, JP-T 2002-509279 discloses a method of using a birefringent multilayer dielectric film. However, the method is problematic in that, when the front reflection zone of 1000 nm is controlled over the near-infrared range, then the reflection at around 400 nm may rather increase to cause a problem of color shift, and therefore the wavelength control is difficult.

There is known a method of using a cholesteric liquid-crystal layer. For example, as disclosed in Japanese Patent 4109914, one cholesteric liquid-crystal layer may be formed on both surfaces of a $\lambda/2$ plate for securing efficient and selective reflection of a light circularly polarized in one direction and falling within a range of from 700 to 1200 nm.

JP-T 2009-514022 discloses an IR-reflective article having a cholesteric liquid-crystal layer. Many trials of using a laminate of plural cholesteric layers in a liquid-crystal display device have been made, and concretely, there are known many trials of efficiently reflecting a light falling within a visible light range. For example, Japanese Patent 3500127 discloses examples of a lamination of a lot of cholesteric layers.

In laminating plural cholesteric layers, there is employed a method of superposing wet coating films of a cholesteric liquid-crystal material one after another through drying, thermal alignment and UV curing thereof. For curing the cholesteric liquid-crystal layer, for example, as exemplified in Japanese patent No. 4008358, there may be generally employed a method of irradiating a polymerizing liquid crystal with UV rays for curing thereof, and for example, there is disclosed a method of forming a wide-area cholesteric liquid-crystal film by controlling the radiation intensity within a predetermined range. Japanese Patent 3745221 discloses a method of forming a continuous wavelength-range polarizing element by laminating plural layers of liquid-crystal molecules to give a multilayer film with so controlling the molecules in each layer as to have the same rotation direction.

SUMMARY OF THE INVENTION

As described in the above, windowpanes, especially those for automobiles are required to have not only good heat shieldability but also high transmittance of visible light from the safety viewpoint, and are further required not to cause radio disturbance in communication with in-car communication instruments such as VICS, Night Vision, etc.

An object of the invention is to provide a heat shield and laminated glass, which, when used for windowpanes of automobiles, do not cause radio disturbance in communication with in-car communication instruments such as VICS, Night Vision or the like, and which secure high transmittance of visible light and have excellent solar radiation heat shieldability.

The means for achieving the object are as follows.

[1] A heat shield comprising:

a first light-reflective layer comprising at least one layer formed of a fixed cholesteric liquid-crystal phase, and reflecting at least one of a right-polarized component and a left-polarized component; and a second light-reflective layer comprising at least one layer containing an organic material and/or an inorganic material;

having a reflectance peak both in a wavelength range of from 400 nm to less than 850 nm and in a wavelength range of from more than 850 nm to 1300 nm; and satisfying C>A>B;

where "A" means the maximum reflectance in the wavelength range of from 400 nm to less than 850 nm; "B" means the reflectance at a wavelength of 850 nm; "C" means the maximum reflectance in the wavelength range of from more than 850 nm to 1300 nm; and "B" is equal to or less than 50%.

[2] The heat shield of [1], wherein the reflectance peak falling in the wavelength range of from 400 nm to less than 850 nm is ascribed to the selective reflectivity of the cholesteric liquid-crystal phase of the first light-reflective layer.

[3] The heat shield of [1] or [2], wherein the first light-reflective layer has the reflectivity of reflecting either a right-polarized component or a left-polarized component.

[4] The heat shield of any one of [1]-[3], wherein the maximum reflectance "A" in the wavelength range of from 400 nm to less than 850 nm is equal to or less than 50%.

[5] The heat shield of any one of [1]-[4], wherein the maximum reflectance "A" in the wavelength range of from 400 nm to less than 850 nm is equal to or more than 10%.

[6] The heat shield of any one of [1]-[5], wherein the maximum reflectance "C" in the wavelength range of from more than 850 nm to 1300 nm is equal to or more than 80%.

[7] The heat shield of any one of [1]-[6], wherein the second light-reflective layer comprises:

at least one layer formed of a fixed cholesteric liquid-crystal phase, reflecting a right-polarized component, and at least one layer formed of a fixed cholesteric liquid-crystal phase, reflecting a left-polarized component.

[8] A heat shield comprising:

a first light-reflective layer comprising at least one layer formed of a fixed cholesteric liquid-crystal phase, and reflecting either a right-polarized component or a left-polarized component; and a second light-reflective layer comprising at least one layer formed of a fixed cholesteric liquid-crystal phase, reflecting a right-polarized component, and at least one layer formed of a fixed cholesteric liquid-crystal phase, reflecting a left-polarized component;

having a reflectance peak in a wavelength range of from 400 nm to less than 850 nm, which is attributed to the selective reflectivity of the cholesteric liquid-crystal phase of the first light-reflective layer; and having a reflectance peak in a wavelength range of from more than 850 nm to 1300 nm, which is attributed to the selective reflectivity of the cholesteric liquid-crystal phase of the second light-reflective layer

[9] The heat shield of [8], wherein the reflectance peak falling in the wavelength range of from 400 nm to less than 850 nm is equal to or less than 50%, and the reflectance peak falling in the wavelength range of from more than 850 nm to 1300 nm is equal to or more than 80%.

[10] The heat shield of [8] or [9], wherein the layers each reflecting the right-polarized component and the left-polarized component in the second light-reflective layer both have the same reflection center wavelength.

[11] The heat shield of any one of [1]-[10], further comprising a substrate of supporting the first and second light-reflective layers.

[12] The heat shield of any one of [1]-[11], wherein the first light-reflective layer is formed by coating.

[13] The heat shield of any one of [1]-[12], which has a solar reflectance, as computed from the data of the optical spectrum thereof, is equal to or more than 18%.

[14] The heat shield of any one of [1]-[13], which is used with a transparent film, on which the heat shield is stuck.

[15] The heat shield of any one of [1]-[13], which is used with a windowpane of an automobile, on which the heat shield is stuck.

[16] Laminated glass comprising a heat shield of any one of [1]-[13] inside it.

[17] Laminated glass of [16], which is used as a windshield of an automobile.

Figure 1:
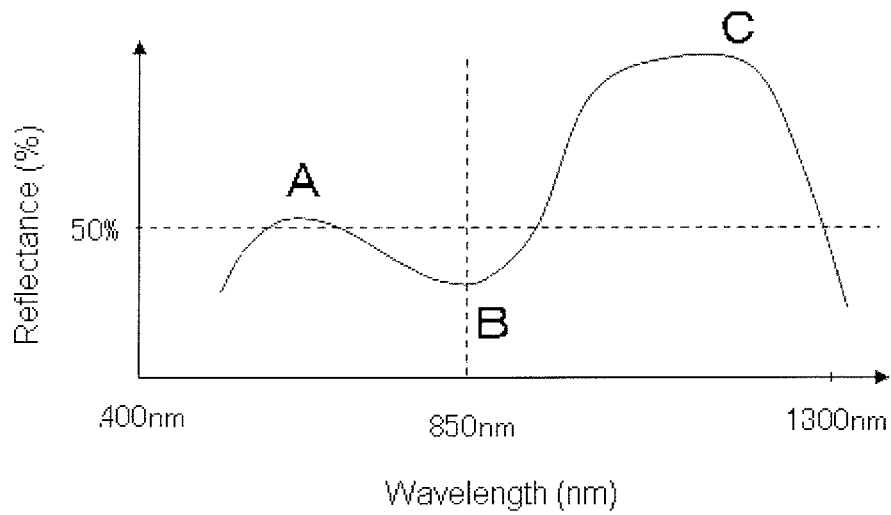
FIG. 1 is one example of the reflectance curve of a heat shield of the invention.

In the drawings, the reference numerals have the following meanings.

10 Heat shield
12 Substrate
14 Second light-reflective layer
14a Layer formed of a fixed cholesteric liquid-crystal phase, reflecting right-polarized component
14b Layer formed of a fixed cholesteric liquid-crystal phase, reflecting left-polarized component
16 First light-reflective layer

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof.

1. Heat Shield:

The invention relates to a heat shield. The heat shield at least comprises a first light-reflective layer having at least one layer formed of a fixed cholesteric liquid-crystal phase, reflecting at least one of a right-polarized component and a left-polarized component, and a second light-reflective layer having at least one layer containing an organic material and/or an inorganic material.

Figure 3:
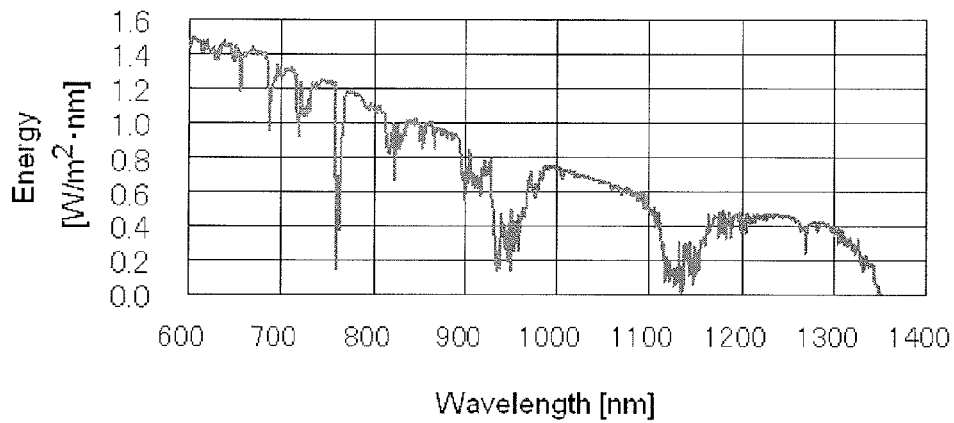
FIG. 3 is a graph showing the relationship between the energy of sunlight and the wavelength thereof.

The heat shield of the invention has a reflectance peak both in a wavelength range of from 400 nm to less than 850 nm and in a wavelength range of from more than 850 nm to 1300 nm, and satisfies C>A>B. "A" means the maximum reflectance in the wavelength range of from 400 nm to less than 850 nm, "B" means the reflectance at a wavelength of 850 nm, "C" means the maximum reflectance in the wavelength range of from more than 850 nm to 1300 nm, and "B" is equal to or less than 50%. One example of the reflectance curve of the heat shield of the invention is shown in FIG. 1. According to the reflectance curve shown in FIG. 1, the heat shield has a large reflectance peak of the maximum value "C" in the IR wavelength range of from more than 850 nm to 1300 nm, and therefore exhibits a high heat shield effect due to this reflectivity. Further, the heat shield has a small reflection peak of the maximum value "A" in the visible right range of from 400 nm to less than 850 nm that has a higher energy level than that of IR light and has a significant influence on thermal load, and therefore, this reflectivity also significantly contributes toward the heat-shielding effect of the heat shield of the invention. Moreover, as a result of the existence of the two reflectance peaks in those wavelength ranges, the reflectance curve has a valley at around the wavelength of 850 nm, and concretely, the reflectance "B" at the wavelength of 850 nm is equal to or less than 50%. Accordingly, the heat shield of the invention does not block out the electromagnetic wave at a wavelength of around 850 nm or so utilized for in-car communication instruments such as VICS, Night Vision, etc., and therefore causes no or little radio disturbance in communication with those communication instruments The wavelength at which the heat shield of the invention gives the reflectance peak in the wavelength range of from 400 nm to less than 850 nm may be any one falling within the range. From the viewpoint of solar radiation heat shielding, it may be advantageous that the heat shield of the invention could reflect the light on the low wavelength side having a large solar energy level, as is obvious from the graph shown in FIG. 3; however, on the other hand, from the viewpoint of the problem of color shift to appear therein, the heat shield of the Invention preferably has reflectivity on the long wavelength side. To that effect, the wavelength at which the heat shield of the invention could give the reflectance peak in the wavelength range of from 400 nm to less than 850 nm will be suitably selected in accordance with the design of the product to be manufactured.

On the other hand, the wavelength at which the heat shield could give the reflectance peak in the wavelength of from more than 850 nm to 1300 nm may also be any one falling within that range; but from the viewpoint of solar radiation heat shielding, the wavelength is preferably from 850 to 1200 nm, more preferably from 850 to 1100 nm.

From the viewpoint of attaining a high heat-shielding effect and attaining a high transmittance of visible light (preferably at least 70%) without blocking out the electromagnetic wave at a wavelength of around 850 nm or so, the maximum reflectance peak "A" in the wavelength region of from 400 nm to less than 850 nm is preferably equal to or less than 50%, provided that C>A>B is satisfied; while on the other hand, for attaining the heat-shielding effect based on the existence of the reflection peak in the wavelength range of from 400 nm to less than 850 nm, the maximum value "A" is preferably equal to or more than 10%. More preferably, the maximum value "A" is from 20 to 48%, even more preferably from 30 to 48%, still more preferably from 40 to 48%. The reflectance "B" at the wavelength of 850 nm is equal to or less than 50%, and is, from the same viewpoint, preferably equal to or less than 40%, more preferably equal to or less than 30%, even more preferably equal to or less than 20%, still more preferably less than 10%, and needless-to-say, this is ideally 0%. Also from the same viewpoint, the maximum reflectance peak "C" in the wavelength range of from more than 850 nm to 1300 nm is preferably equal to or more than 70%, more preferably equal to or more than 80%, even more preferably equal to or more than 90%.

The heat shield of the invention has the reflectance curve satisfying C>A>B as shown in FIG. 1, and the insolation reflectance as computed from the data of the optical spectrum thereof is preferably equal to or more than 18% (more preferably equal to or more than 20%, even more preferably equal to or more than 22%). Tts (total solar energy transmitted through glazing) of automobile windshields is computed through measurement of transmittance/reflectance in the indicated wavelength range using a spectrometer (300 to 2500 nm) according to ISO 13837. For the reflectance measurement, the outdoor side of glass is the incident light side. The state of California in US will restrict Tts of automobile windshields to at most 50%. According to the invention, it is possible to provide a heat shield having Tts of equal to or less than 50%.

As the index of heat shieldability, there is also Rds (direct solar energy reduced against a glazing). Also according to ISO 13837, Rds is computed through measurement of reflectance in the indicated wavelength range using a spectrometer (300 to 2500 nm). For the reflectance measurement, the outdoor side of glass is the incident light side.

The reflectance and the transmittance of the heat shield and the laminated glass of the invention are measured according to this standard. The same shall apply to Examples.

In the invention, preferably, the reflectance peak existing in the wavelength range of from 400 nm to less than 850 nm is attributed to the selective reflectivity of the cholesteric liquid-crystal phase of the first light-reflective layer. The cholesteric liquid-crystal phase exhibits selective reflectivity of reflecting light at a specific wavelength due to the helical pitch. Accordingly, by regulating the helical pitch of the cholesteric liquid-crystal phase therein, the heat shield may be readily given the reflectivity of showing the reflectance peak in the wavelength range of from 400 nm to less than 850 nm. Further, in the invention, for maintaining the high transmittance of visible light, the maximum reflectance peak "A" is equal to or less than 50%, as described in the above. For attaining this characteristic, preferably, the first light-reflective layer comprises at lest one layer formed of a fixed cholesteric liquid-crystal phase, and has the reflectivity of reflecting either a right-polarized component or a left-polarized component. Having the reflectivity of reflecting either a right-polarized component or a left-polarized component, the layer can easily attain the reflectance peak of equal to or less than 50%. Further, by regulating the thickness of the layer, the reflectance of the layer can be changed to attain various preferred characteristics in accordance with the intended use of the heat shield of the invention. The reflection center wavelength depends on the helical pitch, and therefore, in case where the peak is desired to be steep, the first light-reflective layer may be so designed as to have one or more layers all having the same helical pitch; while on the other hand, when the peak is desired to be broadened, then the first light-reflective layer may be so designed as to have plural layers each having a different helical pitch. In a preferable embodiment, the first light-reflective layer is composed of plural layers all of which are formed of a fixed cholesteric liquid-crystal phase having the same optical rotation direction. The first light-reflective layer, having such a constitution, can have the reflectivity characteristic of reflecting either a right-polarized component or a left-polarized component.

On the other hand, the reflectivity characteristic of the heat shield in the IR wavelength region of from more than 850 nm to 1300 nm is attributed to the second light-reflective layer. The second light-reflective layer is not specifically defined in point the material and the light reflection principle thereof, so far as the layer can give the high reflectance peak in the IR wavelength range and can satisfy the requirement of C>A>B. Regarding the material thereof, the second light-reflective layer may be formed of an organic material such as a cholesteric liquid-crystal composition or the like, like the first light-reflective layer, or may be formed of an inorganic material such as a metal, a metal oxide or the like. The layer may also be formed of a mixture of such an organic material and an inorganic material. The light reflection principal of the second light-reflective layer is also the same as that of the first light-reflective layer, or that is, the second light-reflective layer uses the selective reflectivity due to the cholesteric liquid-crystal phase like the first light-reflective layer, or may use the light reflectivity due to the alternate laminate of a high-reflectivity film and a low-reflectivity film.

Preferably, the second light-reflective layer contains a layer formed of a fixed cholesteric liquid-phase like the first light-reflective layer, and more preferably contains at least one layer formed of a fixed cholesteric liquid-crystal phase capable of reflecting a right-polarized component, and at least one layer formed of a fixed cholesteric liquid-crystal phase fixed capable of reflecting a left-polarized component. Containing the layers each having selective reflectivity for the right-polarized component and the left-polarized component in the IR wavelength range, the second light-reflective layer can readily attain the reflectance peak of equal to or more than 80% in the IR wavelength range.

Figure 2:
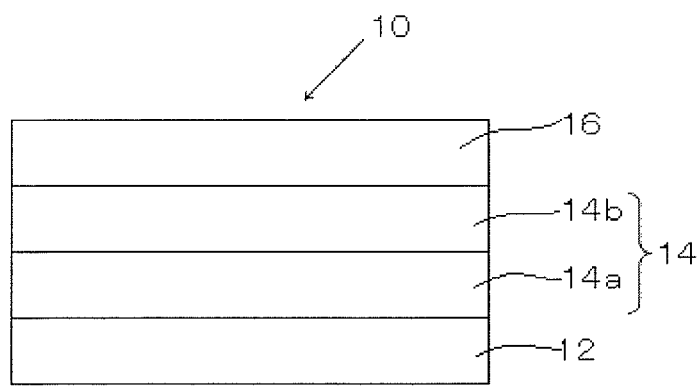
FIG. 2 is a schematic cross-sectional view of one example of a heat shield of the invention.

FIG. 2 shows a schematic cross-sectional view of one example of the heat shield of the invention that shows the reflectance curve of FIG. 1. The heat shield 10 of FIG. 2 has, as formed on the substrate 12 thereof, a second light-reflective layer 14 that comprises a layer 14a formed of a fixed cholesteric liquid-crystal phase capable of reflecting a right-polarized component, and a layer 14b formed of a fixed cholesteric liquid-crystal phase capable of reflecting a left-polarized component, and a first light-reflective layer 16 that comprises a layer formed of a fixed cholesteric liquid-crystal phase capable of reflecting either a right-polarized component or a left-polarized component. The second light-reflective layer 14 is so controlled that the helical pitch of the cholesteric liquid-crystal phase of the layers 14a and 14b therein could be on the same level and the two layers 14a and 14b could have the selective reflection center wavelength in the wavelength range of from more than 850 nm to 1300 nm; and as the result that the second light-reflective layer 14 could reflect both the right-polarized component and the left-polarized component falling within that wavelength range, the layer could give a high reflectance peak in the wavelength range. On the other hand, the first light-reflective layer 16 is so controlled that the helical pitch of the cholesteric liquid-crystal phase therein could have a selective reflection center wavelength in the wavelength range of from 400 nm to less than 850 nm, and as the result that the first light-reflective layer could reflect either the right-polarized component or the left-polarized component in that wavelength range, the layer could give a low reflectance peak in the wavelength range. As the result that the layers each have the reflectance peak in their wavelength ranges, the reflectance curve has a valley at the wavelength of 850 nm.

The selective reflectivity to light falling within the wavelength range of from more than 850 nm to 1300 nm may be generally attained by the cholesteric liquid-crystal phase having a helical pitch of from 500 to 1350 nm or so (preferably from 500 to 900 nm or so, more preferably from 550 to 800 nm or so), and having a thickness of from 1 μm to 8 μm or so (preferably from 3 to 8 μm or so). The selective reflectivity to light falling within the wavelength range of from 400 nm to less than 850 nm may be generally attained by the cholesteric liquid-crystal phase having a helical pitch of from 280 to 550 nm or so and having a thickness of from 1 μm to 8 μm or so (preferably from 3 to 8 μm or so). By selecting and controlling the type and the concentration of the material (mainly liquid-crystal material and chiral agent) for use in forming the layers, the light-reflective layer having a desired helical pitch can be formed. Selecting the chiral agent and the liquid-crystal material gives the cholesteric liquid-crystal phase having a desired optical rotation. The thickness of the layer may be controlled to fall within a desired by controlling the coating amount.

The reflectivity of reflecting a right-polarized component or a left-polarized component is determined by the optical rotation of the cholesteric liquid-crystal phase. The optical rotation of the cholesteric liquid-crystal phase is determined by the molecular structure of the liquid crystal and by the molecular structure of the chiral agent added to the liquid crystal. For example, one of the layers 14a and 14b may be formed of a liquid-crystal composition that contains a chiral agent having a right optical rotation, while the other may be formed of a liquid-crystal composition that contains a chiral agent having a left optical rotation. In case where a chiral agent having the same torsional force is used, increasing the amount to be added of the chiral agent reduces the helical pitch while decreasing the amount thereof enlarges the helical pitch.

In FIG. 2, the second light-reflective layer 14 consists of two layers; however, the invention is not limited to this constitution. Laminating the layers each having a different helical pitch broadens the reflectance peak falling within the wavelength range of from more than 850 nm to 1300 nm, therefore giving the second light-reflective layer having a high reflectance in the entire IR range. When two layers each reflecting the polarized component in the opposite directions and both having the same selective reflection center wavelength are combined into one pair, and when a plurality of such pairs are laminated, the resulting laminate may exhibit a high reflectance in the IR range. When two or more those pairs of neighboring light-reflective layers are so combined that each pair has a different helical pitch, the wavelength range of the light to be reflected by the laminate structure is broadened, and therefore the laminate structure exhibits a broad-range light reflectivity.

In FIG. 2, the first light-reflective layer 16 is a single-layer structure; however, the invention is not limited to this constitution. Laminating layers each having a different helical pitch may provide the first light-reflective layer having a broad reflectance peak in the wavelength range of from 400 nm to less than 850 nm. However, in order that the maximum reflectance "A" in this wavelength range could be equal to less than 50%, preferably, the layers constituting the first light-reflective layer all exhibit a selective reflectivity of reflecting a polarized component in one and the same direction.

In FIG. 2, the substrate 12 has the function of supporting the first light-reflective layer 16 and the second light-reflective layer 14. In case where the first light-reflective layer 16 and the second light-reflective layer 14 are formed by coating, the substrate is necessary during the layer formation, but after the layer formation, the substrate may be removed. The substrate 12 includes a glass plate, a polymer plate, etc. The heat shield 10 having the substrate 12 of the type is self-supporting, and can be used as a window material by itself. The substrate 12 may also be a polymer film or a polymer sheet. The heat shield 10 having the filmy substrate 12 is not self-supporting, and may be therefore attached to the surface of a glass plate for windows or the like, or may be incorporated in laminated glass.

The relative positional relationship between the first light-reflective layer and the second light-reflective layer is not also specifically defined. The heat shield may receive sunlight on any side thereof to attain the same heat-shielding capability. Concretely, in FIG. 2, sunlight may come in the heat shield from the backside of the substrate 12 or from the surface side of the first light-reflective layer 16. In this, the first light-reflective layer 16 and the second light-reflective layer 14 may be replaced with each other.

Next, examples of the material which can be used for preparing the heat shield of the invention will be described in detail.

(1) First Light-Reflective Layer

The heat shield of the invention has a first light-reflective layer comprising at least one layer formed of a fixed cholesteric liquid crystal phase. A curable liquid crystal composition is preferably used for preparing the light-reflective layer. One example of the composition contains, at least, a rod-like liquid crystal compound, an optically-active compound (chiral agent) and a polymerization initiator. Two or more types of each of the ingredients may be used. For example, polymerizable and non-polymerizable liquid-crystal compounds may be used in combination. Or, low-molecular weight or high-molecular weight liquid-crystal compounds may be used in combination. Furthermore, each of the light-reflective layers may contain at least one additive selected from any additives such as homogenous-alignment promoter, anti-unevenness agent, anti-repelling agent and polymerizable monomer for improving the uniformity of alignment, the coating property or the film strength. If necessary, the liquid crystal composition may contain any polymerization inhibitor, antioxidant, ultraviolet absorber, light-stabilization agent, colorant, fine particles of metal oxide or the like in an amount unless the optical properties thereof are lowered.

(1)-1 Rod-like Liquid Crystal Compound

Examples of the rod-like which can be used in the invention include nematic rod-like liquid crystal compounds. Preferable examples of the nematic rod-like liquid crystal include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. In the invention, the liquid crystal compound can be selected from not only low-molecular weight compounds but also high-molecular weight compounds.

The rod-like liquid crystal compound to be used in the invention may be polymerizable or not polymerizable. Examples of the rod-like liquid crystal having no polymerizable group are described in many documents such as Y. Goto et. al., Mol. Cryst. Liq. Cryst. 1995, Vol. 260, pp. 23-28.

A polymerizable rod-like liquid crystal compound may be prepared by introducing a polymerizable group in rod-liquid crystal compound. Examples of the polymerizable group include an unsaturated polymerizable group, epoxy group, and aziridinyl group; and an unsaturated polymerizable group is preferable; and an ethylene unsaturated polymerizable group is especially preferable. The polymerizable group may be introduced in a rod-like liquid crystal compound according to any method. The number of the polymerizable group in the polymerizable rod-like liquid crystal compound is preferably from 1 to 6 and more preferably from 1 to 3. Examples of the polymerizable rod-like liquid crystal compound include those described in Makromol. Chem., vol. 190, p. 2255 (1989), Advanced Materials, vol. 5, p. 107 (1993), U.S. Pat. No. 4,683,327, U.S. Pat. No. 5,622,648, U.S. Pat. No. 5,770,107, WO95/22586, WO95/24455, WO97/00600, WO98/23580, WO98/52905, JPA No. 1-272551, JPA No. 6-16616, JPA No. 7-110469, JPA No. 11-80081 and JPA No. 2001-328973. Plural types of polymerizable rod-like liquid crystal compounds may be used in combination. Using plural types of polymerizable rod-like liquid crystal compounds may contribute to lowering the alignment temperature.

(1)-2-Optically-Active Compound (Chiral Agent)

The liquid crystal composition is preferably capable of forming a cholesteric liquid crystal phase, and preferably contains at least one optically-active compound. However, if the rod-like liquid crystal compound having a chiral carbon in its molecule is used, some of the compositions containing such a rod-like liquid crystal compound may be capable of stably forming a cholesteric liquid crystal phase even if they don't contain any optically-active compound. The optically-active compound may be selected from any known chiral agents such as those used in twisted-nematic (TN) and super-twisted-nematic (STN) modes, which are described, for example, in "Ekisho Debaisu Handobukku (Liquid Crystal Device Handbook)", Third Chapter, 4-3 Chapter, p. 199, edited by No. 142 Committee of Japan Society for the Promotion of Science, published by the Nikkan Kogyo Shimbun, Ltd., in 1989. Although, generally, an optically-active compound has a chiral carbon in its molecule, axially chiral compounds and planar chiral compound, having no chiral carbon, may be used as a chiral compound in the invention. Examples of the axially chiral compound or the planar chiral compound include binaphthyl, helicene, paracyclophane and derivatives thereof. The optically-active compound (chiral compound) may have at least one polymerizable group. Using a polymerizable optically-active compound along with a polymerizable rod-like compound, it is possible to obtain a polymer having repeating units derived from the optically-active compound and the rod-like liquid crystal compound respectively by carrying out the polymerization thereof. In such an embodiment, the polymerizable group in the optically-active compound is preferably same as that in the rod-like liquid crystal compound. Accordingly, the polymerizable group in the optically-active compound is preferably selected from an unsaturated polymerizable group, epoxy group and aziridinyl group; and an unsaturated polymerizable group is preferable; and an ethylene unsaturated polymerizable group is especially preferable.

The optically-active compound may be selected from liquid crystal compounds.

An amount of the optically-active compound is preferably from 1 to 30% by mole with respect to an amount of the rod-like liquid crystal compound used along with it. A smaller amount of the optically-active compound is more preferable since influence thereof on liquid crystallinity may be small. Accordingly, optically-active compounds having a strong helical twisting power are preferable since they may achieve the desired helical pitch by being added in a small amount. Examples of such an optically-active compound having a strong helical twisting power include those described in JPA 2003-287623.

(1)-3 Polymerization Initiator

The liquid crystal composition to be used for preparing each of the light-reflective layers is preferably a polymerizable liquid crystal composition; and on its own, the composition preferably contains at least one polymerization initiator. According to the invention, the polymerization may be carried out under irradiation of ultraviolet light, and the polymerization initiator is preferably selected from photo-polymerization initiators capable of initiating polymerizations by irradiation of ultraviolet light. Examples of the photo-polymerization initiator include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046,127 and 2,951,758), combinations of triarylimidazole dimer and p-aminophenyl ketone (those described in U.S. Pat. No. 3,549,367), acrydine and phenazine compounds (those described in Japanese Laid-Open Patent Publication "Tokkai" No. S60-105667 and U.S. Pat. No. 4,239,850), and oxadiazole compounds (those described in U.S. Pat. No. 4,212,970).

An amount of the photo-polymerization initiator is preferably from 0.1 to 20% by mass, more preferably from 1 to 8% by mass, with respect to the liquid crystal composition (the solid content when the composition is a coating liquid).

(1)-4 Alignment Controlling Agent

Any alignment controlling agent, which can contribute to stably or promptly forming a cholesteric liquid crystal phase, may be added to the liquid crystal composition. Examples of the alignment controlling agent include fluorine-containing (meth)acrylate series polymers and compounds represented by formula (X1)-(X3). Two or more types selected from these compounds may be used in combination. These compounds may contribute to aligning liquid crystal molecules with a small tilt angle or horizontally at the air-interface alignment. It is to be understood that the term "horizontal alignment" in the specification means that the direction of long axis of a liquid crystalline molecule is parallel to the layer plane, wherein strict parallelness is not always necessary; and means, in this specification, that a tilt angle of the mean direction of long axes of liquid crystalline molecules with respect to the horizontal plane is smaller than 20°. The layer in which liquid crystal molecules are horizontally aligned at the air-interface may hardly suffer from alignment defects, and may have a high transparency for a visible light and have a high reflection rate. On the other hand, the layer in which liquid crystal molecules are aligned with a large tilt angle may suffer from the finger-print pattern, and may have a low reflective rate, high haze and diffraction characteristics, because of the misalignment between the helical axis of the cholesteric liquid crystal phase and the normal line of the layer surface.

Examples of the fluorine-containing (meth)acrylate series polymer, which can be used as an alignment controlling agent, include those described in JPA 2007-272185, [0018]-[0043].

The compounds represented by formula (X1)-(X3), which can be used as an alignment controlling agent, will be describe in detail respectively.

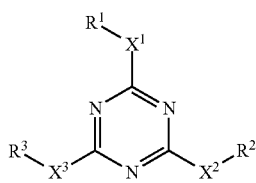

(X1)

In the formula, $R^1$, $R^2$ and $R^3$ each independently represent a hydrogen atom or a substituent group; $X^1$, $X^2$ and $X^3$ each independently represent a single bond or divalent linking group. The substituent group represented by $R^1$-$R^3$ respectively is preferably a substituted or non-substituted alkyl group (more preferably a non-substituted alkyl or a fluorinated alkyl group), an aryl group (more preferably an aryl group having at least one fluorinated alkyl group), a substituted or non-substituted amino group, an alkoxy group, an alkylthio group, or a halogen atom. The divalent linking group represented by $X^1$, $X^2$ and $X^3$ respectively is preferably selected from the group consisting of an alkylene group, an alkenylene group, a divalent aryl group, a divalent heterocyclic group, —CO—, —NR$^a$— (where $R^a$ represents a $C_{1-5}$ alkyl group or a hydrogen atom), —O—, —S—, —SO—, —SO$_2$— and any combinations thereof. The divalent linking group is preferably selected from the group consisting of an alkylene group, a phenylene group, —CO—, —NR$^a$—, —O—, —S—, —SO$_2$— and any combinations thereof. The number of carbon atom(s) in the alkylene group is preferably from 1 to 12. The number of carbon atoms in the alkenylene group is preferably from 2 to 12. The number of carbon atoms in the aryl group is preferably from 6 to 10.

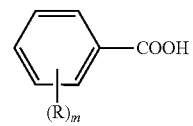

(X2)

In the formula, R represents a substituent group; and m is an integer of from 0 to 5. When m is equal to or more than 2, two or more R are same or different from each other. Preferable examples of the substituent group represented by R are same as those exemplified above as an example of $R^1$, $R^2$ or $R^3$ in formula (X1). In the formula, m is preferably from 1 to 3, and is especially preferably 2 or 3.

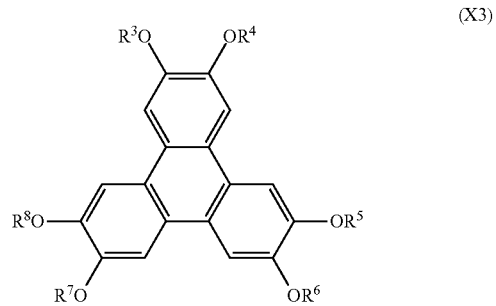

(X3)

In the formula, $R^4$, $R^5$, $R^6$, $R^7$, $R^8$ and $R^9$ each independently represent a hydrogen atom or a substituent group. Preferable examples of $R^4$, $R^5$, $R^6$, $R^7$, $R^8$ or $R^9$ include those exemplified above as an example of $R^1$, $R^2$ or $R^3$ in formula (X1).

Examples of the compound represented by formula (X1), (X2) or (X3), which can be used as an alignment controlling agent, include the compounds described in JPA 2005-99248.

One compound of formula (X1), (X2) or (X3) may be used alone, or two or more compounds of formula (X1), (X2) or (X3) may be used in combination.

An amount of the compound represented by formula (X1), (X2) or (X3) to be added to the liquid crystal composition is preferably from 0.01 to 10% by mass, more preferably from 0.01 to 5% by mass, or especially preferably from 0.02 to 1 by mass, with respect to an amount of the liquid crystal compound.

The first light-reflective layer is preferably prepared by coating. One example of the production method includes at least the following steps:

(1) applying a curable liquid-crystal composition to the surface of a light transmissive substrate to form a cholesteric liquid-crystal phase thereon, and (2) irradiating the curable liquid-crystal composition with ultraviolet light for promoting the curing reaction, thereby fixing the cholesteric liquid-crystal phase and then forming a light-reflective layer.

By repeating the steps of (1) and (2) two or more times on one surface of a substrate, or by repeating the steps of (1) and (2) one or more on both surfaces of a substrate coinstantaneously or sequentially, the heat shield having two or more light-reflective layers can be prepared.

In the step (1), first, a curable liquid-crystal composition is applied onto the surface of a substrate or a lower light-reflective layer. The curable liquid-crystal composition is preferably prepared as a coating liquid of the material dissolved and/or dispersed in a solvent. The coating liquid may be applied to the substrate or the like, according to various methods of a wire bar coating method, an extrusion coating method, a direct gravure coating method, a reverse gravure coating method, a die coating method or the like. As the case may be, an inkjet apparatus may be used in which a liquid-crystal composition may be jetted out through a nozzle to form the intended coating film.

Next, the coating film of the curable liquid-crystal composition formed on the surface of the substrate or the like is made to have a cholesteric liquid-crystal phase. In an embodiment where the curable liquid-crystal composition is prepared as a coating liquid that contains a solvent, the coating film may be dried to remove the solvent, thereby the coating film may be made to have the intended cholesteric liquid-crystal phase. If desired, the coating film may be heated up to the transition temperature to the cholesteric liquid-crystal phase. For example, the coating film is once heated up to the temperature of the isotopic phase, and then cooled to the cholesteric liquid-crystal phase transition temperature, whereby the film may stably have the intended cholesteric liquid-crystal phase. The liquid-crystal transition temperature of the curable liquid-crystal composition is preferably within a range of from 10 to 250 degrees Celsius from the viewpoint of the production aptitude, more preferably within a range of from 10 to 150 degrees Celsius. When the temperature is lower than 10 degrees Celsius, the coating film may require a cooling step or the like for cooling it to the temperature range within which the film could exhibit a liquid-crystal phase. On the other hand, when the temperature is higher than 250 degrees Celsius, the coating film may require a higher temperature in order that it could be in an isotropic liquid state at a higher temperature than the temperature range within which the film once exhibits a liquid-crystal phase; and this is disadvantageous from the viewpoint of heat energy dissipation, substrate deformation, degradation, etc.

Next, in the step (2), the coating film in a cholesteric liquid-crystal state is irradiated with ultraviolet light to promote the curing reaction thereof. For ultraviolet irradiation, used is a light source of an ultraviolet lamp or the like. In this step, the ultraviolet irradiation promotes the curing reaction of the liquid-crystal composition, and the cholesteric liquid-crystal phase is thereby fixed and the intended light-reflective layer is thus formed.

The ultraviolet irradiation energy dose is not specifically defined, but in general, it is preferably from 100 $mJ/cm^2$ to 800 $mJ/cm^2$ or so. Not specifically defined, the time for ultraviolet radiation to the coating film may be determined from the viewpoint of both the sufficient strength of the cured film and the producibility thereof.

For promoting the curing reaction, ultraviolet irradiation may be attained under heat. The temperature in ultraviolet irradiation is preferably kept within a temperature range within which the cholesteric liquid-crystal phase can be kept safely as such with no disturbance. The oxygen concentration in the atmosphere participates in the degree of polymerization of the cured film. Accordingly, in case where the cured film could not have the intended degree of polymerization in air and the film strength is therefore insufficient, preferably, the oxygen concentration in the atmosphere is lowered according to a method of nitrogen purging or the like. The preferred oxygen concentration is at most 10%, more preferably at most 7%, most preferably at most 3%. The reaction rate of the curing reaction (for example, polymerization reaction) to be promoted by the ultraviolet irradiation is preferably at least 70% from the viewpoint of keeping the mechanical strength of the layer and for the purpose preventing unreacted matters from flowing out of the layer, more preferably at least 80%, even more preferably at least 90%. For increasing the reaction rate, a method of increasing the ultraviolet irradiation dose or a method of carrying out the polymerization in a nitrogen atmosphere or under a heating condition may be effective. Also employable is a method of keeping the polymerization system, after once polymerized, in a higher temperature condition than the polymerization temperature to thereby further promote the thermal polymerization reaction, or a method of again irradiating the reaction system with ultraviolet light (in this, however, the additional ultraviolet irradiation should be attained under the condition that satisfies the condition of the invention). The reaction rate may be determined by measuring the infrared oscillation spectrum of the reactive group (for example, the polymerizing group) before and after the reaction, followed by comparing the data before and after the reaction.

In the above step, the cholesteric liquid-crystal phase is fixed and the intended light-reflective layer is thereby formed. A most typical and preferred embodiment of the "fixed" liquid-crystal state is such that the alignment of the liquid-crystal compound to form the cholesteric liquid-crystal phase is held as such, to which, however, the invention is not limited. Concretely, the fixed state means that, in a temperature range of generally from 0 to 50 degrees Celsius, or from −30 to 70 degrees Celsius under a severer condition, the layer does not have flowability and does not undergo any alignment morphology change in an external field or by an external force applied thereto, and the layer can continue to stably keep the fixed alignment morphology. In the invention, the alignment state of the cholesteric liquid-crystal phase is fixed through the curing reaction as promoted by ultraviolet irradiation.

In the invention, it is enough that the optical properties of the cholesteric liquid-crystal phase are held in the layer, and finally it is any more unnecessary that the liquid-crystal composition in the light-reflective layer exhibits liquid crystallinity. For example, the liquid-crystal composition may be converted to a high-molecular weight substance and may lose the liquid crystallinity.

(2) Second Light-Reflective Layer

The second light-reflective layer may be prepared by using any material(s), and the second light-reflective layer may have reflective properties due to any light-reflective principle. As well as the first light-reflective layer, the second light-reflective layer is preferably formed of a fixed cholesteric liquid crystal phase; and the second light-reflective layer more preferably comprises at least one layer formed of a fixed cholesteric liquid-crystal phase, reflecting a right-polarized component, and at least one layer formed of a fixed cholesteric liquid-crystal phase, reflecting a left-polarized component. In this embodiment, preferable examples of the material and the method to be used for preparing the second light-reflective layer are same as those exemplified for preparing the first light-reflective layer.

The second light-reflective layer may contain metal or metal oxide. Examples of the material and the method to be used for preparing the second light-reflective layer of this embodiment include those described in JPA-2002-131531 and JPA-6-194517. The second light-reflective layer may have the light-reflective properties due to the alternate laminate of a high-reflectivity film and a low-reflectivity film as shown in JPT-2002-509279. Examples of the material and the method to be used for preparing the second light-reflective layer of this embodiment include those described in the document.

(3) Substrate

The heat shield of the invention may have a substrate supporting the light-reflective layers. The substrate is preferably optically-transparent. Examples of the substrate include glass plates and plastic plates. For example, any glass or plastic plates to be used for windows may be used as the substrate; any embodiments having such a glass or plastic plate as the substrate may be used without any change as a heat-shield window member Examples of the light-transmissive substrate include any glass plates to be used for laminated glass. For example, the first and second light-reflective layers may be incorporated into a laminated glass, which can be used as a heat-shield window member. A laminated glass is usually prepared by carrying out a thermal adhesion of interlayer films respectively formed on surfaces of two glass plates. For incorporating the first and second light-reflective layers into such a laminated glass, the surface of either the first or second light-reflective layer may be subjected to a thermal adhesion to the surface of an interlayer film. An interlayer film usually contains polyvinyl butyral (PVB) or ethylene-vinyl acetate copolymer (EVA) as a major ingredient. The thickness of the interlayer film to be used in the invention is preferably from about 380 micro meters to about 760 micro meters.

Or the heat shield itself, having a not self-supporting substrate such as a film or sheet and the first and second light reflective layers thereon, may be incorporated into a laminated glass.

The thickness of the glass plate to be used as a light-transmissive substrate is not especially limited, and may vary depending on the applications thereof. For examples, in the applications of a front window (windshield) for transport vehicles, generally, the glass plates having the thickness of from 2.0 to 2.3 mm are preferably used; and, in the applications of a heat-shield window member for houses and buildings, generally, the glass plates having the thickness of from 40 to 300 micro meters are preferably used. However, the thickness of the glass plate is not limited to these ranges.

Examples of the light-transmissive substrate include polymer films. The polymer film to be used as a substrate is not limited especially. In some applications, the substrate may be required to have a high transmission for a visible light. Polymer films having a high transmission for a visible light include those used in display devices such as a liquid crystal display device as an optical film. Preferable examples of the polymer film which can be used as a substrate include poly ester films such as polyethylene terephthalate (PET), polybutylene and polyethylene naphthalate (PEN) films; polycarbonate (PC) films; polymethylmethacrylate films; polyolefin films such as polyethylene and polypropylene films; polyimide films, triacetyl cellulose (TAC) films.

The heat shield film or sheet, having a polymer film or the like as a light-transmissive substrate, may be stuck on the surface of a glass or plastic plate. In this embodiment, the surface of the glass or plastic plate to be stuck on the heat shield is preferably adhesive. In this embodiment, the heat shield preferably has an adhesion layer, easy-adhesion layer or the like, which makes the adhesion thereof possible. Or any non-adhesive heat shield may be stuck on the surface of a glass plate by using any adhesive agent.

The heat shield of the invention itself may be used as a heat shield window windshield) for transport vehicles or buildings; or the heat shield of the invention may be used as a sheet or film for imparting heat-shield properties to be stuck on the surface of window (windshield) of transport vehicles or buildings. The heat shield of the invention may be used as a freeze showcase, member for agricultural houses, agricultural reflective sheet, solar cell film or the like.

EXAMPLES

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

1. Production of Heat Shield Film:

(1) Preparation of Light-Reflective Layer-forming Coating Liquids (A) and (B):

Coating liquids (A) and (B) having the formulation shown in the following Table were prepared.

| Formulation of Coating Liquid (A) | | |
|---|---|---|
| Materials (types) | Name (producer) | Amount |
| Rod-like liquid crystal compound | RM-257 (Merck) | 10.000 parts by mass |
| Chiral agent | LC-756 (BASF) | 0.293 parts by mass |
| Polymerization initiator | Irgacure 819 (Ciba Specialty Chemicals) | 0.419 parts by mass |
| Alignment controlling agent | Compound 1 shown below | 0.016 parts by mass |
| Solvent | 2-butanone (Wako) | 15.652 parts by mass |

| Formulation of Coating Liquid (B) | | |
|---|---|---|
| Materials (types) | Name (producer) | Amount |
| Rod-like liquid crystal compound | RM-257 (Merck) | 10.000 parts by mass |
| Chiral agent | Compound 2 shown below | 0.183 parts by mass |
| Polymerization initiator | Irgacure 819 (Ciba Specialty Chemicals) | 0.419 parts by mass |
| Alignment controlling agent | Compound 1 shown below | 0.016 parts by mass |
| Solvent | 2-butanone (Wako) | 15.652 parts by mass |

Alignment controlling agent: Compound 1 (described in JP-A 2005-99248)

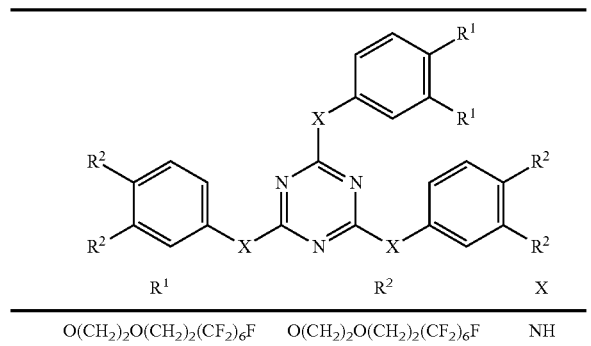

| R[1] | R[2] | X |
|---|---|---|
| $O(CH_2)_2O(CH_2)_2(CF_2)_6F$ | $O(CH_2)_2O(CH_2)_2(CF_2)_6F$ | NH |

Chiral Agent: Compound 2 (described in JP-A 2002-179668)

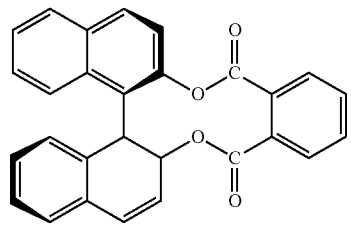

cholesteric liquid-crystal phase was cured. In that manner, a light-reflective layer was formed, thereby producing a heat-shielding film.

In case where a heat-shielding film having at least two light-reflective layers laminated therein is produced, the first light-reflective layer is formed and then cooled to room temperature, and the same operation as above is repeated.

In the above production method, the concentration of the chiral agent LC-756 and/or the chiral agent compound 2 was varied to thereby control the helical pitch and regulate the reflection wavelength range of the heat-shielding film. The thickness of each layer was varied, as shown in the following Table. The thickness of the layer not specifically indicated in the following Table is 6 μm as above.

Figure 4:
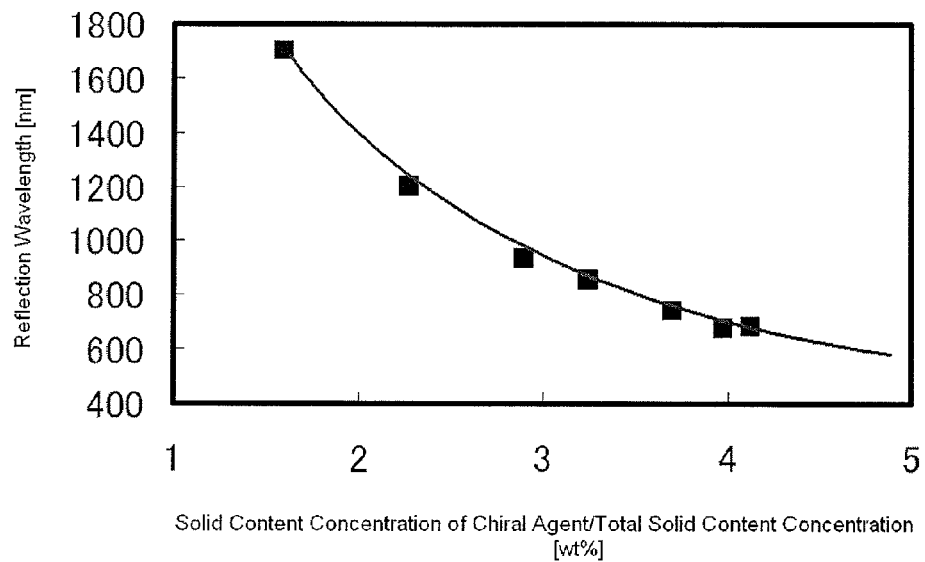
FIG. 4 is a graph showing one example of the relationship between the concentration of a chiral agent and the reflection wavelength of the layer containing the chiral agent.

In the graph shown in FIG. 4, the horizontal axis indicates the chiral agent concentration, and the vertical axis indicates the selective reflection wavelength of the layer formed by fixing the cholesteric liquid-crystal phase of the liquid-crystal composition that contains the chiral agent at the varying concentration. From the graph of FIG. 4 (showing the relationship between the chiral agent concentration and the selective wavelength), it can be understood that, by controlling the chiral agent concentration, both the reflectivity having the reflectance peak in the wavelength range of from 400 nm to less than 850 nm that is required for the first light-reflective layer, and the reflectivity having the reflectance peak in the wavelength range of from more than 850 nm to 1300 nm that is required for the second light-reflective layer are attained.

The constitution of the heat-shielding film produced herein is shown below.

| Heat Shield Film No. | First Light-Reflective Layer | Second Light-Reflective Layer |
|---|---|---|
| 1 (Example) | Right optical rotation single layer (helical pitch: 484 nm) | Right optical rotation two layers (helical pitch: 599 nm and 669 nm) Left optical rotation two layers (helical pitch: 599 nm and 669 nm) |
| 2 (Example) | Right optical rotation single layer (helical pitch: 484 nm) | Right optical rotation two layers (helical pitch: 618 nm and 682 nm) Left optical rotation two layers (helical pitch: 618 nm and 682 nm) |
| 3 (Example) | Right optical rotation single layer (helical pitch: 510 nm) | Right optical rotation two layers (helical pitch: 599 nm and 669 nm) Left optical rotation two layers (helical pitch: 599 nm and 669 nm) |
| 4 (Example) | Right optical rotation single layer (helical pitch: 484 nm) | Right optical rotation two layers (helical pitch: 592 nm and 669 nm) Left optical rotation two layers (helical pitch: 592 nm and 669 nm) The thickness of each layer was changed to 5 micro meters. |
| 5 (Example) | Right optical rotation single layer (helical pitch: 484 nm) | Right optical rotation two layers (helical pitch: 599 nm and 669 nm) Left optical rotation two layers (helical pitch: 599 nm and 669 nm) The thickness of each layer was changed to 4 micro meters. |
| 6 (Comparative Example) | — | Alternate laminate of five layers of Ag and In (indium) by a vacuum film-forming (sputtering) method, having the total thickness of 170 nm |
| 7 (Comparative Example) | Right optical rotation single layer (helical pitch: 510 nm) Left optical rotation single layer (helical pitch: 510 nm) The thickness of each layer was changed to 5 micro meters. | Right optical rotation two layers (helical pitch: 599 nm and 669 nm) Left optical rotation two layers (helical pitch: 599 nm and 669 nm) |
| 8 (Comparative Example) | Right optical rotation single layer (helical pitch: 510 nm) The thickness of the layer was changed to 3 micro meters. | Right optical rotation two layers (helical pitch: 599 nm and 669 nm) Left optical rotation two layers (helical pitch: 599 nm and 669 nm) |

(2) Formation of Light-Reflective Layer:

Using a wire bar, the prepared coating liquid (A) or (B) was applied onto FUJIFILM's PET film at room temperature. The dry thickness could be 6 μm.

Next, this was dried at room temperature for 30 seconds, then heated in an atmosphere at 125° C. for 2 minutes to give a cholesteric liquid-crystal phase, and thereafter this was UV-irradiated with Fusion's D bulb (lamp 90 mW/cm) at an output of 60% for 6 to 12 seconds at 95° C., whereby the 2. Evaluation of Heat Shield:

The optical spectrum of the produced heat-shielding film was measured, and from the found data, the solar reflectance of the film was computed. The heat-shielding film was arranged in a transceiver for the signal at a wavelength of 850 nm, and evaluated for the electromagnetic wave transmittance thereof. The results are shown in the following Table. In the column of electromagnetic wave characteristic in the Table, "○" means that the film has electromagnetic wave transmittance, and "x" means that the film has no electromagnetic wave transmittance; in the column of coloration therein, "○" means absence of visible coloration and "x" means presence of visible coloration.

| Heat Shield Film No. | Reflectance B*1 | Maximum Reflectance C*2 | Maximum Reflectance A*3 | Solar Reflectance | Transmittance of Electromagnetic Wave | Coloration |
|---|---|---|---|---|---|---|
| 1 (Example) | 40% | 90% | 45% | 22.5% | ○ | ○ |
| 2 (Example) | 30% | 90% | 45% | 22.2% | ○ | ○ |
| 3 (Example) | 50% | 90% | 45% | 22.0% | ○ | ○ |
| 4 (Example) | 40% | 80% | 45% | 20% | ○ | ○ |
| 5 (Example) | 40% | 70% | 45% | 18.5% | ○ | ○ |
| 6 (Comparative Example) | 60% | 65% | 10% | 21.0% | X | ○ |
| 7 (Comparative Example) | 70% | 90% | 80% | 22.8% | ○ | X |
| 8 (Comparative Example) | 40% | 90% | *4 | 16% | ○ | ○ |

*1A means the maximum reflectance in the wavelength range of from 400 nm to less than 850 nm.
*2B means the reflectance at a wavelength of 850 nm.
*3C means the maximum reflectance in the wavelength range of from more than 850 nm to 1300 nm.
*4 The peak of about 10% was found in the reflectance curve, but the peak was broad.

The invention claimed is:

1. A heat shield comprising:
    a first light-reflective layer comprising at least one layer formed of a fixed cholesteric liquid-crystal phase, and reflecting at least one of a right-polarized component and a left-polarized component; and
    a second light-reflective layer comprising at least one layer containing an organic material and/or an inorganic material;
    wherein the heat shield has a reflectance peak both in a wavelength range of from 400 nm to less than 850 nm and in a wavelength range of from more than 850 nm to 1300 nm; and
    satisfies C>A>B;
    where "A" means the maximum reflectance in the wavelength range of from 400 nm to less than 850 nm; "B" means the reflectance at a wavelength of 850 nm; "C" means the maximum reflectance in the wavelength range of from more than 850 nm to 1300 nm; and "B" is equal to or less than 50%.

2. The heat shield of claim 1, wherein the reflectance peak falling in the wavelength range of from 400 nm to less than 850 nm is ascribed to the selective reflectivity of the cholesteric liquid-crystal phase of the first light-reflective layer.

3. The heat shield of claim 1, wherein the first light-reflective layer has the reflectivity of reflecting either a right-polarized component or a left-polarized component.

4. The heat shield of claim 1, wherein the maximum reflectance "A" in the wavelength range of from 400 nm to less than 850 nm is equal to or less than 50%.

5. The heat shield of claim 1, wherein the maximum reflectance "A" in the wavelength range of from 400 nm to less than 850 nm is equal to or more than 10%.

6. The heat shield of claim 1, wherein the maximum reflectance "C" in the wavelength range of from more than 850 nm to 1300 nm is equal to or more than 80%.

7. The heat shield of claim 1, wherein the second light-reflective layer comprises:
    at least one layer formed of a fixed cholesteric liquid-crystal phase, reflecting a right-polarized component, and
    at least one layer formed of a fixed cholesteric liquid-crystal phase, reflecting a left-polarized component.

8. The heat shield of claim 1, further comprising a substrate of supporting the first and second light-reflective layers.

9. The heat shield of claim 1, wherein the first light-reflective layer is formed by coating.

10. The heat shield of claim 1, which has a solar reflectance, as computed from the data of the optical spectrum thereof, is equal to or more than 18%.

11. The heat shield of claim 1, which is used with a transparent film, on which the heat shield is stuck.

12. The heat shield of claim 1, which is used with a windowpane of an automobile, on which the heat shield is stuck.

13. Laminated glass comprising a heat shield of claim 1 inside it.

14. Laminated glass of claim 13, which is used as a windshield of an automobile.

15. A heat shield comprising:
    a first light-reflective layer comprising at least one layer formed of a fixed cholesteric liquid-crystal phase, and reflecting either a right-polarized component or a left-polarized component; and
    a second light-reflective layer comprising at least one layer formed of a fixed cholesteric liquid-crystal phase, reflecting a right-polarized component, and at least one layer formed of a fixed cholesteric liquid-crystal phase, reflecting a left-polarized component;
    wherein the heat shield has a reflectance peak in a wavelength range of from 400 nm to less than 850 nm, which is attributed to the selective reflectivity of the cholesteric liquid-crystal phase of the first light-reflective layer; and has a reflectance peak in a wavelength range of from more than 850 nm to 1300 nm, which is attributed to the selective reflectivity of the cholesteric liquid-crystal phase of the second light-reflective layer.

16. The heat shield of claim 15, wherein the reflectance peak falling in the wavelength range of from 400 nm to less than 850 nm is equal to or less than 50%, and the reflectance peak falling in the wavelength range of from more than 850 nm to 1300 nm is equal to or more than 80%.

17. The heat shield of claim 15, wherein the layers each reflecting the right-polarized component and the left-polarized component in the second light-reflective layer both have the same reflection center wavelength.

18. The heat shield of claim 15, further comprising a substrate of supporting the first and second light-reflective layers.

19. The heat shield of claim 15, wherein the first light-reflective layer is formed by coating.

20. The heat shield of claim 15, which has a solar reflectance, as computed from the data of the optical spectrum thereof, is equal to or more than 18%.

21. The heat shield of claim 15, which is used with a transparent film, on which the heat shield is stuck.

22. The heat shield of claim 15, which is used with a windowpane of an automobile, on which the heat shield is stuck.

23. Laminated glass comprising a heat shield of claim 15 inside it.

24. Laminated glass of claim 23, which is used as a windshield of an automobile.

\* \* \* \* \*